A. H. WOODWARD.
STATION COIN REGISTER.
APPLICATION FILED APR. 15, 1915.

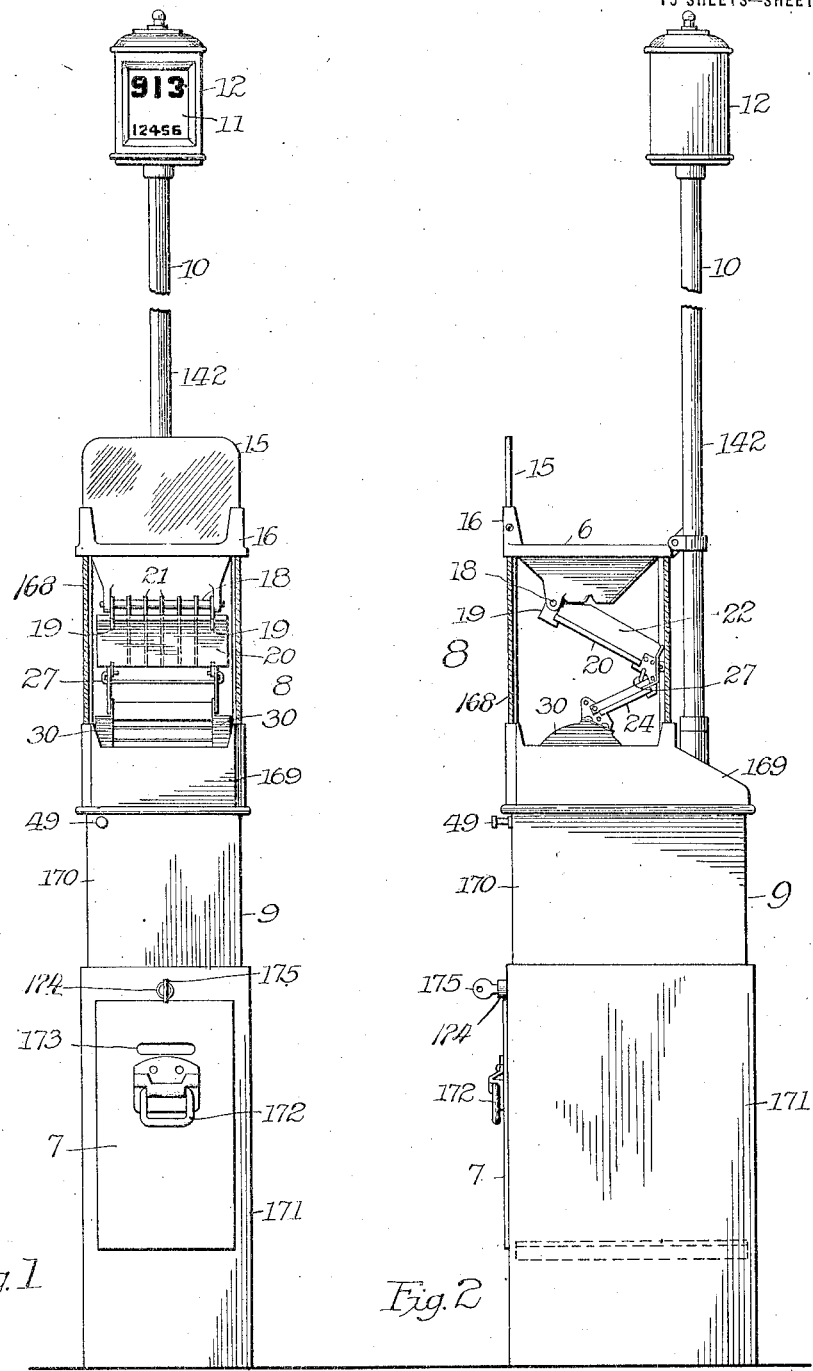

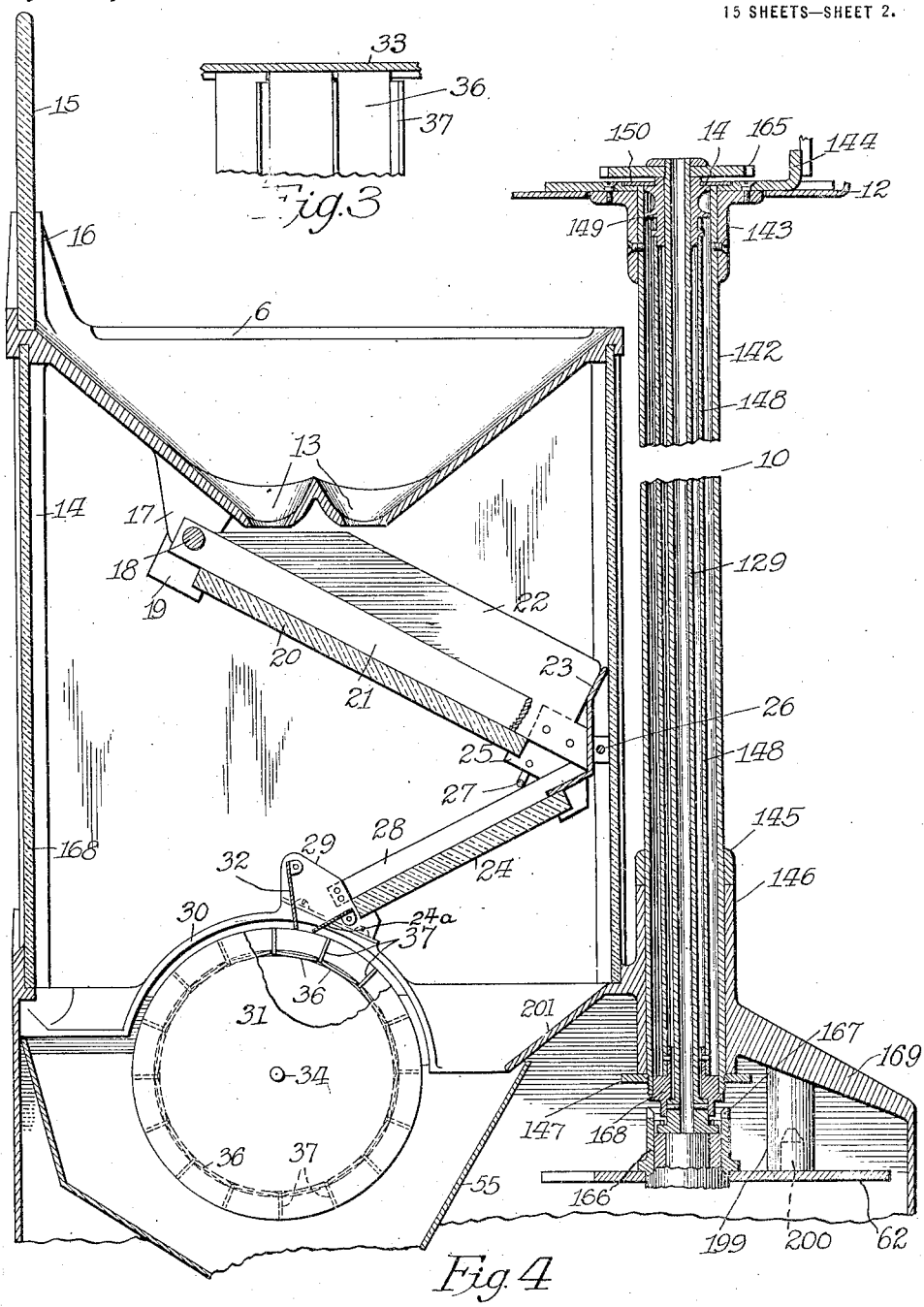

1,344,841.

Patented June 29, 1920.
15 SHEETS—SHEET 4.

Witnesses

Inventor
Arthur H. Woodward
By Brown, Hanson & Boettcher
Att'ys

A. H. WOODWARD.
STATION COIN REGISTER.
APPLICATION FILED APR. 15, 1915.

1,344,841.

Patented June 29, 1920.
15 SHEETS—SHEET 7.

Witnesses:

Inventor
Arthur H. Woodward
By Brown, Hanson & Boettcher
Att'ys

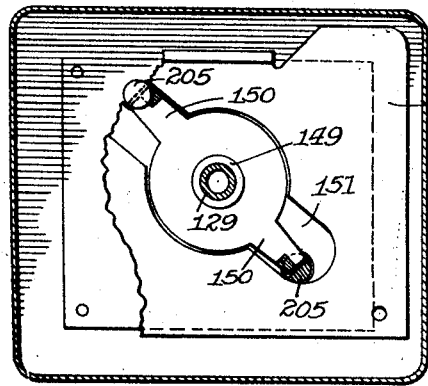
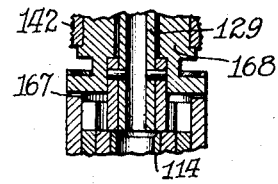
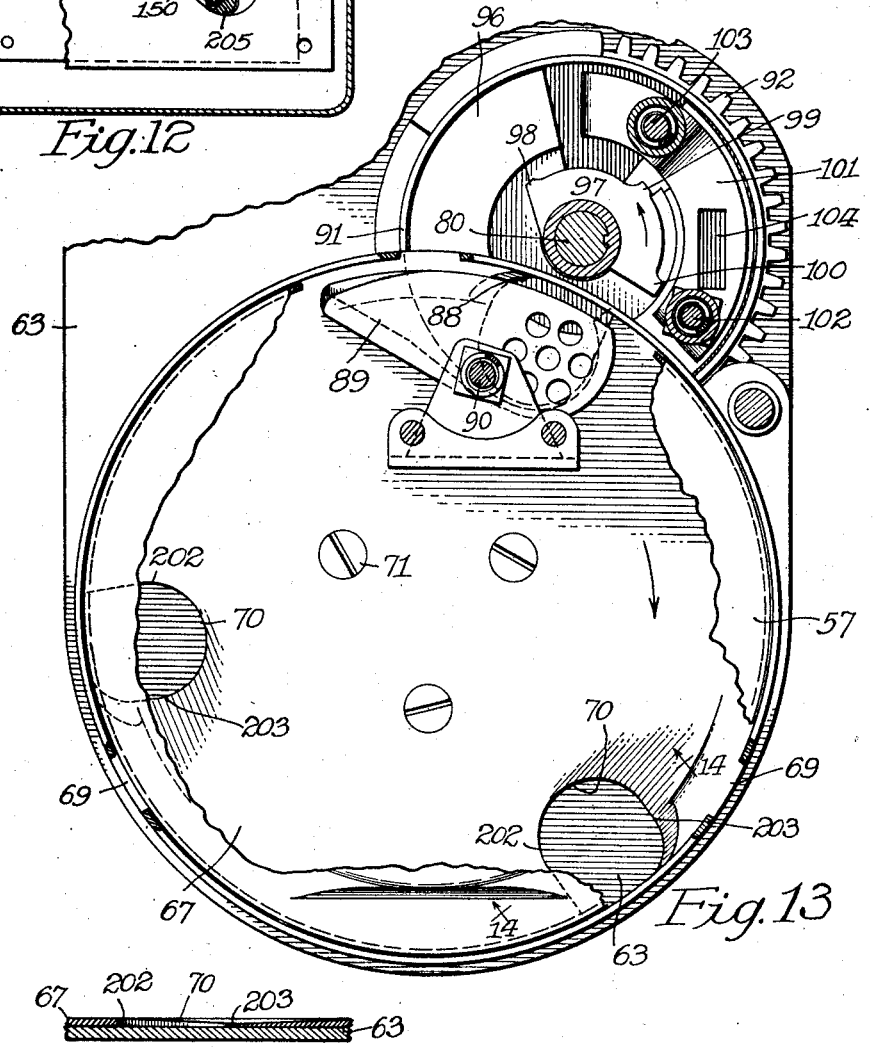

A. H. WOODWARD.
STATION COIN REGISTER.
APPLICATION FILED APR. 15, 1915.

1,344,841.

Patented June 29, 1920.
15 SHEETS—SHEET 10.

Witnesses:

Inventor
Arthur H. Woodward
By Brown, Hanson & Boettcher
Att'ys

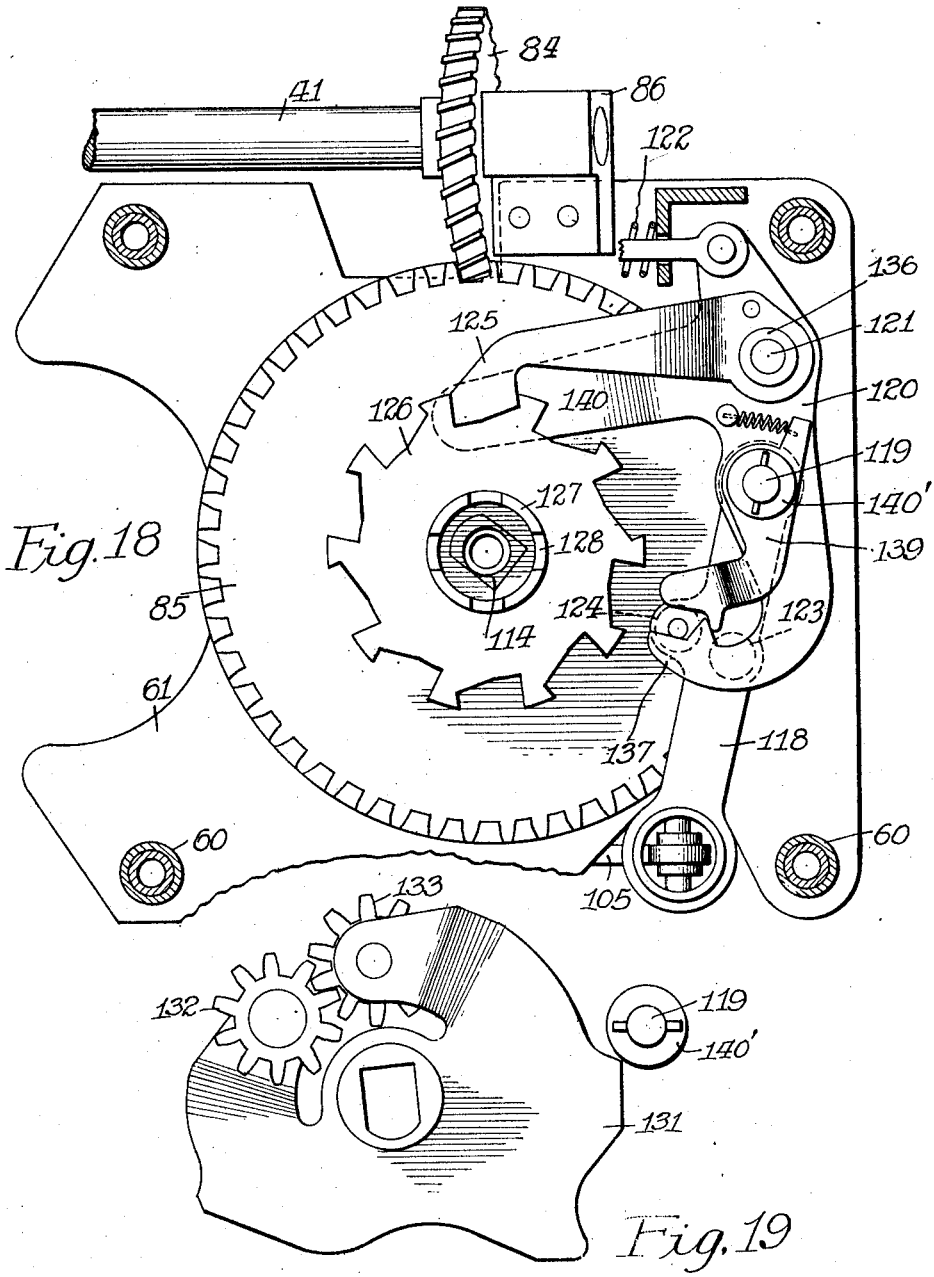

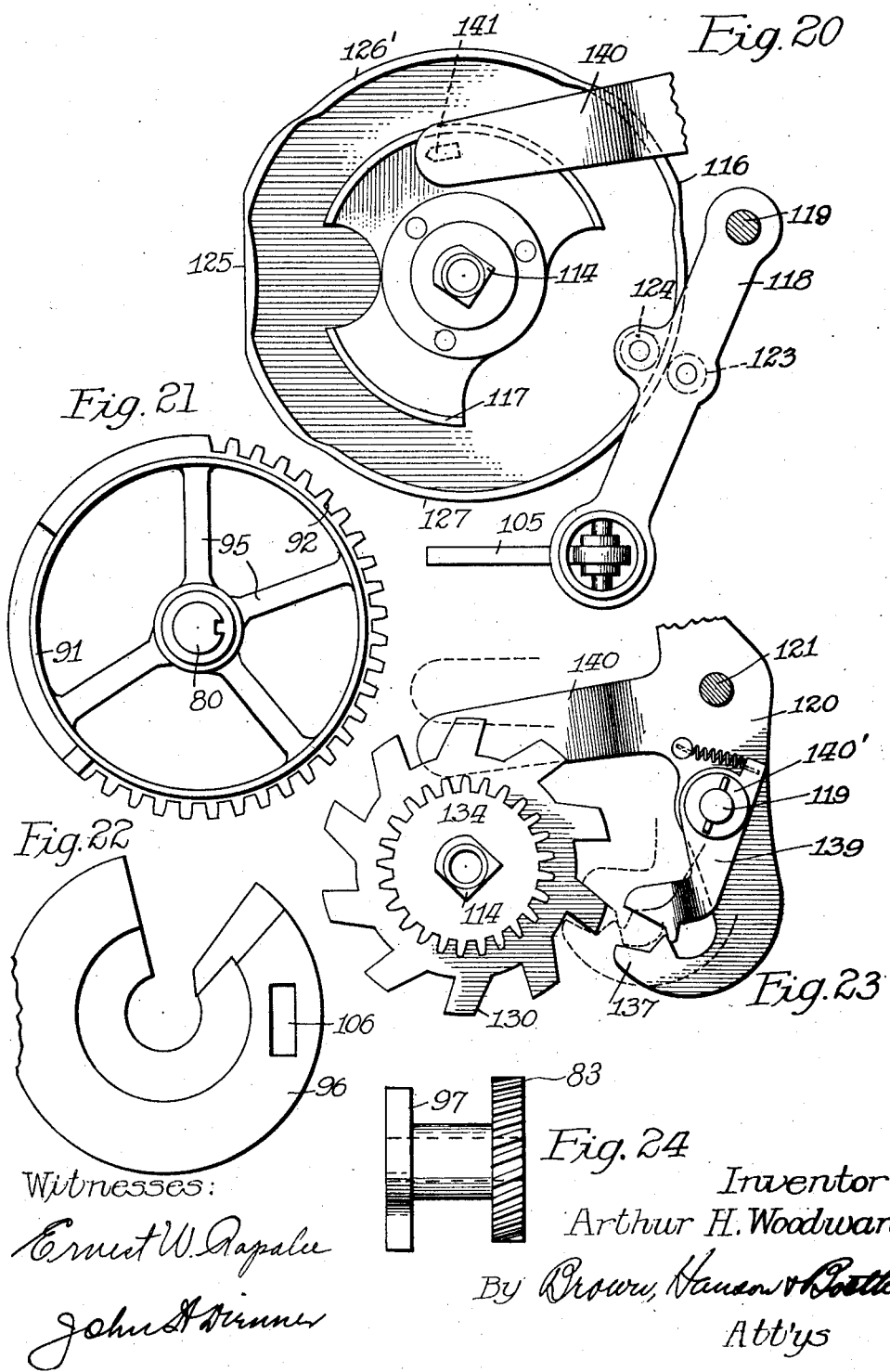

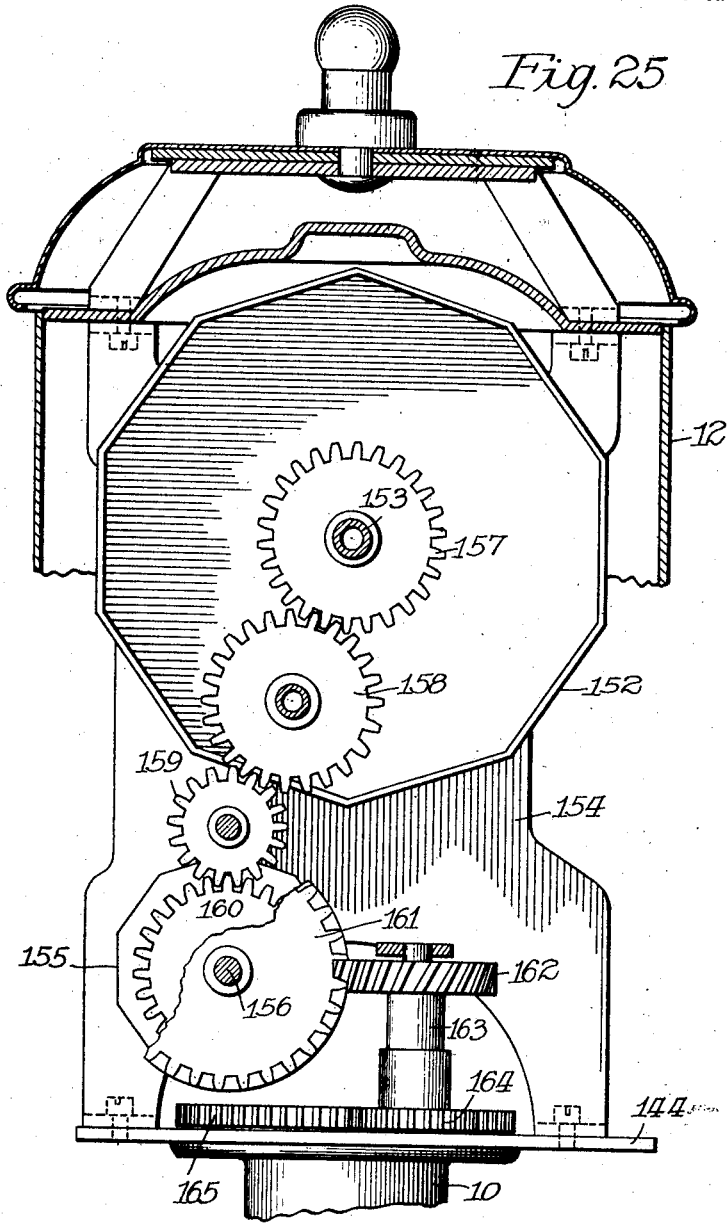

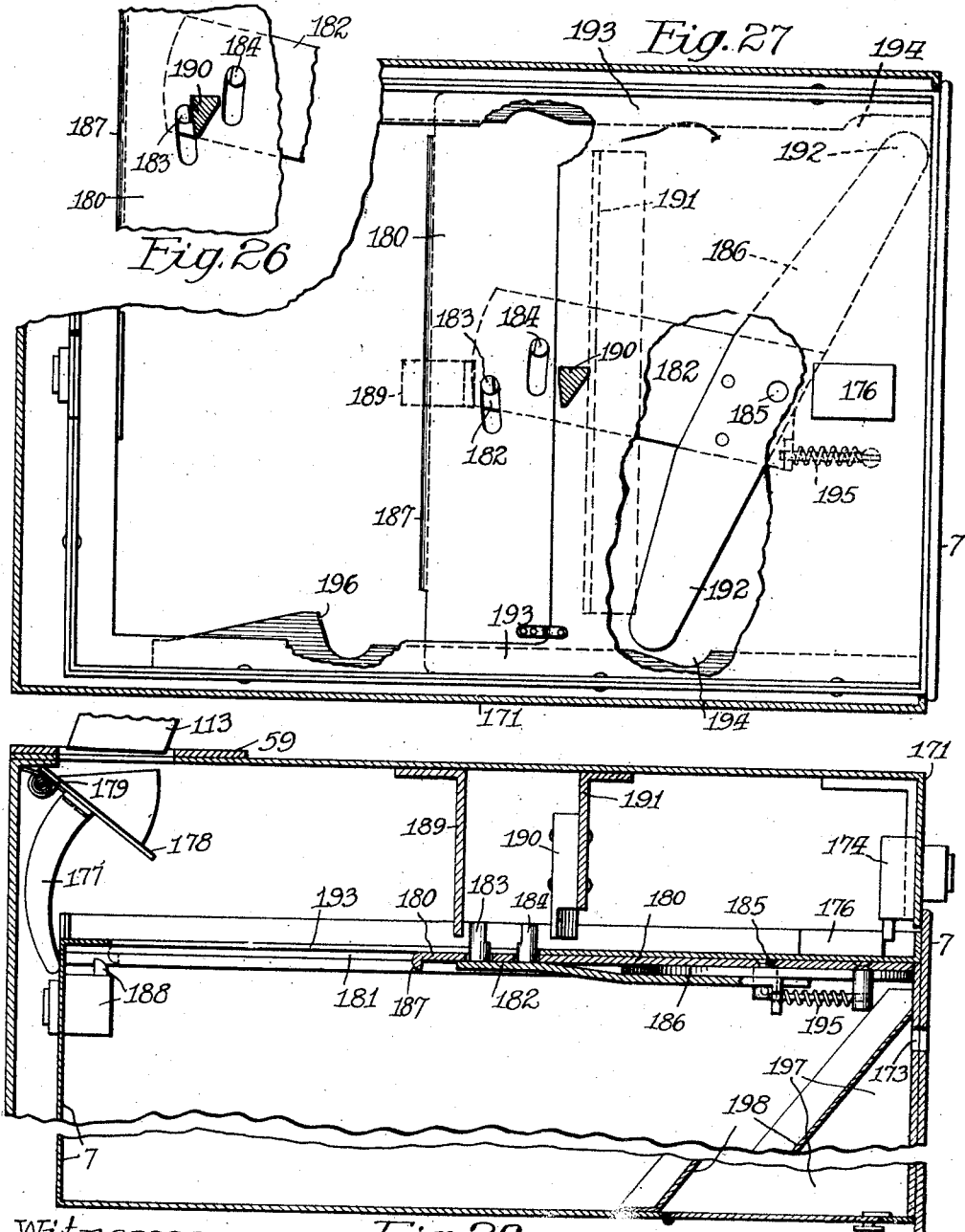

A. H. WOODWARD.
STATION COIN REGISTER.
APPLICATION FILED APR. 15, 1915.
1,344,841.
Patented June 29, 1920.
15 SHEETS—SHEET 15.
Fig. 29
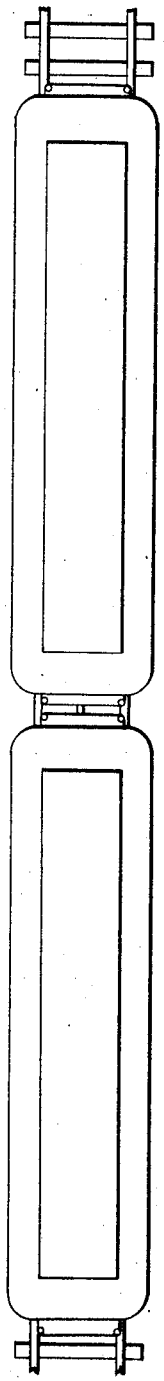
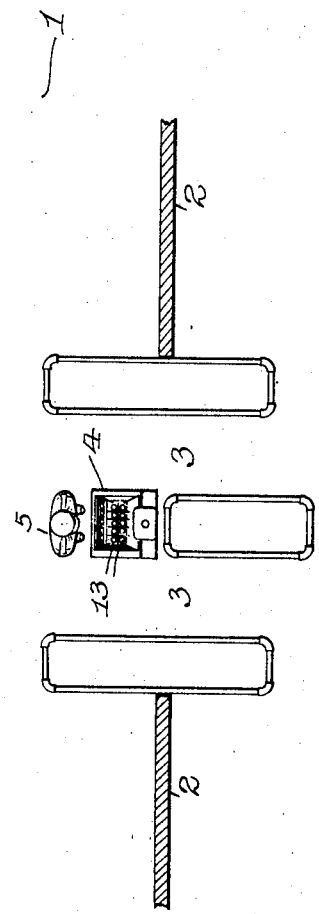
Witnesses:
Ernest W. Rapalee
John H. Renner
Inventor
Arthur H. Woodward
By Brown, Hanson & Boettcher
Att'ys

UNITED STATES PATENT OFFICE.

ARTHUR H. WOODWARD, OF ALTADENA, CALIFORNIA, ASSIGNOR, BY MESNE ASSIGNMENTS, TO JOHNSON FARE BOX COMPANY, OF CHICAGO, ILLINOIS, A CORPORATION OF NEW YORK.

STATION COIN-REGISTER.

1,344,841.      Specification of Letters Patent.      Patented June 29, 1920.

Application filed April 15, 1915. Serial No. 21,540.

*To all whom it may concern:*

Be it known that I, ARTHUR H. WOODWARD, a citizen of the United States, residing at Altadena, in the county of Los Angeles and State of California, have invented a certain new and useful Improvement in Station Coin-Registers, of which the following is a full, clear, concise, and exact description, reference being had to the accompanying drawings, forming a part of the specification.

The subject-matter of the present invention is a station coin register.

This invention is devised to aid in rapid and accurate collection of admission fees at the entrance or gate of an inclosure or building or the like, wherein is provided means for performing a public or quasi-public service, for a fee. I employ the term "fee" to designate a uniform charge payable for securing the right to enjoy such public or quasi-public service.

The present invention makes practical the pay-as-you-enter plan of collecting fees for public or quasi-public service.

The object of the present invention, broadly stated, is the provision of improved means to insure collection of the proper fee for enjoying a public or quasi-public service. A further object is the provision of means to aid in rapid and accurate collection, measuring and registering of coins tendered as fees. The invention is also directed as solving a number of subsidiary and adjunctive problems, some of which are the following: the provision of an improved coin hopper to collect the coins; the provision of improved coin-inspection means; the provision of constantly-operating coin-measuring mechanism, and disconnectible feeding-mechanism; the provision of an improved automatically-locking coin-box; the provision of improved means for controlling registration of coins while a coin-box is being removed or replaced; the connection of the various mechanisms into a compact and convenient form, and the provision of a suitable casing for containing and housing the various mechanisms. Numerous other problems are also solved by the present invention.

According to my invention, a coin-collecting, measuring and registering means is located adjacent the entrance of an inclosure within which a public service is rendered. The collecting, measuring and registering mechanism is so located with respect to the entrance of the inclosure that it is readily accessible to patrons coming within the inclosure through the entrance. At the same time the mechanism is so arranged as to be readily visible by patrons or inspectors within the inclosure, to insure that proper collection, measuring and registration of the coins presented as fees is made.

In the accompanying drawings in which I have illustrated an embodiment of my invention:

Figure 1 is a front elevation, partly in section, of the coin-collection, measuring and registering mechanism;

Fig. 2 is a side elevation, partly in section, of the same;

Fig. 3 is a fragmentary detail view showing the manner in which the inspection drum is built up of angle strips.

Fig. 4 is an enlarged fragmentary vertical cross-section showing the coin-collecting hopper and the inspection mechanism, showing also the tubular column and the operating mechanism therein for operating the overhead register.

Fig. 11 is a cross-sectional view taken at right-angles to Fig. 4, showing the connection between the coin-measuring mechanism and the mechanism extending through the column for operating the overhead register;

Fig. 12 is a section of the casing surrounding the overhead register, showing the manner in which this casing is held in position.

Fig. 13 is a fragmentary detail view taken at an angle of about forty-five degrees to Fig. 9, showing the coin-pan for collecting the coins and feeding them to the measuring chamber at the upper right-hand part of the figure;

Fig. 14 is a fragmentary cross-section taken on the line 14—14 of Fig. 13, showing the configuration of the coin-carrying holes or recesses in the bottom of the coin-pan;

Fig. 18 is an enlarged detail view of part of the clutch mechanism for transmitting motion from the coin-measuring mechanism to the register;

Fig. 19 is a plan view of a part of the gearing and the cam employed in the clutch mechanism shown in Fig. 14;

Fig. 20 is a fragmentary plan view of the cam employed in testing for the presence of a coin within the coin-measuring chamber;

Fig. 21 is a plan view of the driving shaft and the mutilated gear which transmits power intermittently to the coin-selecting pan;

Fig. 22 is a plan view of the stationary bottom of the coin-measuring chamber. This part in the assembled condition lies immediately above the mutilated gear, shown in Fig. 21;

Fig. 23 is a fragmentary detail view of a part of the clutch mechanism;

Fig. 24 is a side elevation of the coin gaging or measuring cam and the skew gear for driving the mutilated gear of Fig. 21;

Fig. 25 is an elevation, partly in section, of the registering mechanism;

Fig. 26 is a fragmentary detail view showing the manner in which the locking mechanism for the automatically-locking box is controlled;

Fig. 27 is a cross-section of the bottom of the casing showing the automatically-locking coin-box in place to receive the coins from the measuring mechanism;

Fig. 28 is a vertical sectional view of the box and casing shown in Fig. 19;

Fig. 29 is a diagram illustrative of the broader features of the invention, showing an inclosure having an entrance thereto, adjacent to which the coin-collecting, measuring and registering mechanism is located, and within which there is means for performing a public or semi-public service.

Figure 5:
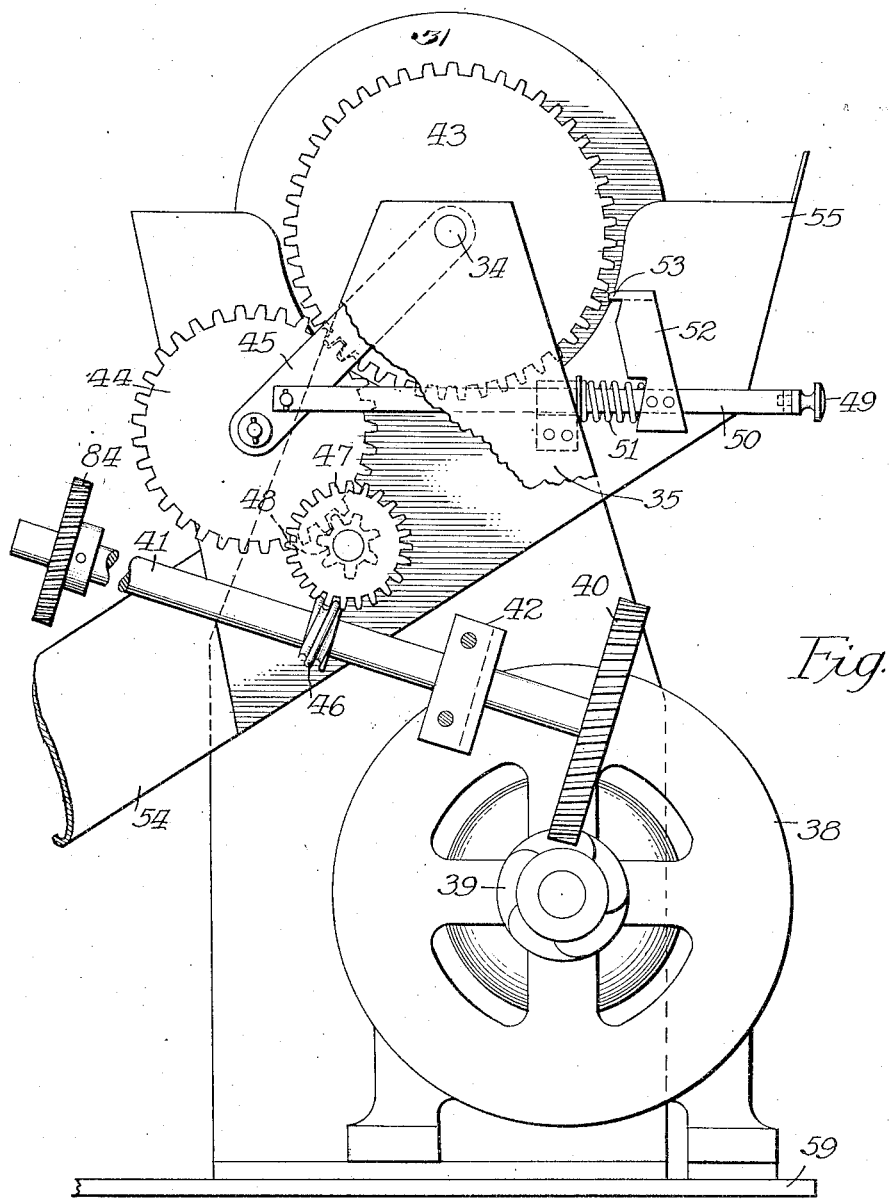
Fig. 5 is a fragmentary view showing the driving motor and connection for driving the inspection mechanism, showing also the means for disconnecting the inspection cylinder.

In Fig. 29 I have illustrated broadly the manner in which my invention is to be carried out. I provide an inclosure 1, within which a public or quasi-public service is rendered to such persons as pay a predetermined feee. In the present case I have shown the inclosure as being that surrounding a railroad station, from which transportation is furnished for a given fee.

The inclosure is maintained by means of the walls 2, which have gates or openings 3 through them for admission of patrons. Within the inclosure 1 a coin-collecting mechanism 4 is provided in such a position that incoming patrons may drop their admission fees into a hopper under the supervision of a guard indicated at 5.

The incoming patrons line up for passage through the gates 3, the formation of an orderly line being facilitated by the guide rails shown on each side and in front of the station coin register 4. The guard 5 is in such position that he can watch the extended hands of the patrons as the patrons file through and deposit their fees. The guide rails extend past the guard so that he can forcibly detain any person failing to deposit the proper fee.

In Figs. 1 and 2 I have shown a mechanism for handling the coins which are offered as fees for admission to the inclosure. This mechanism comprises primarily a hopper 6, a receiving coin-box 7, inspection mechanism 8 for facilitating inspection by the guard of the coins dropped into the hopper offered as fees. There is provided a suitable casing 9 surrounding the inspection mechanism, the coin-box 7 and the coin-measuring mechanism which will be described later. The casing supports by means of a column 10 an overhead register 11 inclosed in a suitable casing 12, forming a continuation of the column 10.

*Coin-hopper and coin-inspection mechanism.*

The coin-hopper 6 shown in cross section in Fig. 4 comprises a trough-shaped hopper having perforations 13 in the bottom thereof arranged in pairs along parallel rows in the bottom of the hopper. The edge of the hopper is beveled to a sharp point to prevent balancing of coins upon the edge thereof. The hopper 6 is supported by metallic corner posts 14 forming the four corners of the transparent casing surrounding the inspection mechanism which is installed immediately below the hopper 6.

A glass guard 15 is secured in brackets 16 in such a manner as to project between the guard or collector and the hopper. This shield or guard prevents the collector from abstracting coins from the hopper without placing himself in such a position that his action would readily be detected. The guard 15 is made transparent so that the collector may at all times have a clear view of the coins that are dropped into the hopper 6. The holes 13 in the bottom of the hopper may be made of such a size as to prevent coins above a certin denomination, i. e., above the capacity of the machine, from being passed through the mechanism.

On the outside of the trough-shaped hopper 6 and adjacent the ends thereof, there are formed a pair of lugs 17, which support a rod 18. A pair of brackets 19 is secured to the rod 18 and these brackets are provided with notches in order to hold an inclined piece of plate glass, or the like, 20, upon which the coins drop after passing through the perforations 13 in the bottom of the hopper.

The machine which I have illustrated is designed for very rapid work, inasmuch as a steady stream of patrons must be taken care of. There is always, under such conditions, a possibility of a patron dropping a bad coin or one of insufficient value into the hopper and passing within the inclosure without being detected by the guard. The patrons drop their coins into the hopper and if the coins are allowed to become indiscriminately mixed the guard will be unable to apprehend the person who deposited the improper coin. I provide special means to enable the guard to follow the coin deposited by any particular person and thus detect the depositor of a spurious coin or a coin of improper value.

A number of parallel strips 21 are set edgewise upon the glass plate 20 and are secured to the rod 18. These strips form suitable guides to provide channels for directing the coins downward from the hopper. The extreme sides of the plate 20 are guarded by means of strips 22, which may be attached to or may be formed integral with the bracket 19. Near the bottom of the plate 20 a metal shield 23 turns the coins in the opposite direction and throws them upon the inclined glass plate 24, which is similar to the plate 20. A depending bracket 25 is secured to each of the side plates 22 and serves to secure the lower end of the plate 20 and the upper end of the plate 24.

A cross-rod 26 passes through the ends of the side plate 22 and through the end of the guide-plates 21, holding them securely in alinement. A rod 27 bent into the form of a bail or elongated U is pivoted in the bracket 25 and rests upon the top of similar guide-plates 28 and serves to turn the coins flat upon the plate 24 as they drop from the plate 20. The guide-plates 28 which form the sides of the slide 24 are secured at their upper ends to the bracket 25 and at their lower ends to brackets 29, which are secured to a semi-circular casing 30 surrounding the coin-inspection cylinder 31. A plate 24$^a$ fastened to the brackets 29 and forming a continuation of the glass slide 24 directs the coins upon the cylinder 31. A swinging plate 32 serves to lay the coins flat upon the cylinder and prevents over-running of the coins when they come down the slide 24.

It can now be seen that the coin dropped from any particular point above the hopper can be followed down upon the inspection cylinder 37. The holes 13 are arranged in pairs, each pair being disposed directly above the individual channels formed by the strips 21 and side plates 22 on the upper slides. Thus, if one patron holds his hand over a certain portion of the hopper when he deposits a coin, the coin will appear for inspection upon the channels immediately below. If the patron is the third person to deposit in that position his coin will appear third in the relative position upon the slides and upon the inspection cylinder.

The coin-inspection cylinder 31 comprises a pair of end-plates 33 Fig. 3 mounted on a shaft 34, which is supported and has its bearings in two end frame plates 35 Fig. 5. The inspection cylinder has a number of flat faces 36, which space the end-plates 33 apart and which form flat carrying spaces for the coins as they come from the slide 24. Radial ribs 37, formed as continuations of the flat strips 36, prevent slipping of the coins across the face of the inspection cylinder. These angle-bars forming the strips 36 and the ribs 37 are made of the proper size to form holding means for the largest size coin that is to be taken by the machine.

The mechanism shown in the drawings is designed to collect and count pennies, nickels and dimes, and the space between the ribs 37 is substantially the width of a nickel five-cent piece. When the machine is in operation the cylinder 31 is revolved to the left, as shown in Fig. 4, so as to bring the coins successively in the view of the collector, who is standing to the left of the mechanism as viewed in Fig. 4.

A motor 38, which I have shown in the present device as an electric motor, is located between the two frame-plates 35 and drives through the gearing shown in Fig. 5 the cylinder 31 as well as the coin-measuring and registering mechanism to be described later. The motor 38 bears a skew gear 39 upon its main shaft. This gear meshes with a similar but larger gear 40, which is secured to the inclined driving shaft 41, mounted in suitable bearings secured to the frame-plates 35. A large gear 43 is fastened on the shaft 34 of the inspection drum 31 and it meshes with an idler gear 44, which has its bearings in a radius rod or link 45, swinging about the shaft 34 as a pivot. Power is transmitted from the shaft 41 through the worm 46 and the pinions 47 and 48, which in turn transmit the power through the idler 44 to the gear 43 of the inspection drum. A push-button 49 extends through the outer casing of the machine as shown in Figs. 1 and 2 and is attached to a rod 50 pivoted to the radius rod 45. A spring 51 normally holds the radius rod in position to keep the gears 44 and 48 in mesh. A detent 52 which is attached to the rod 50 has a tooth 53 for engaging the gear 43 when the button 49 is pushed inwardly. Pressure upon the button disengages the idler 44 from the pinion 48 and at the same time throws the detent tooth 53 into the teeth of the gear 43, holding the inspection cylinder in a stationary position until such time as pressure upon the button is released. This allows inspection of a coin beyond the usual time that the same would appear before the operator in its course from the slide to the chute below.

A chute 54 conducts the coins from the inspection apparatus to the selecting, measuring and registering apparatus. This chute is provided with a trough or funnel-shaped hood 55 which partially incloses the inspection cylinder 31 so as to receive the coins as they are dropped off the left-hand edge of the inspection cylinder, as shown in Fig. 4.

If by any chance any coin or other object should fall back of the slide 24 or off the edges thereof, the bottom 201 of the casing 169 directs the object into the trough 55, whence it goes by the chute 54 to the coin selecting pan 56.

*Coin-selecting and measuring mechanism.*

Figure 6:
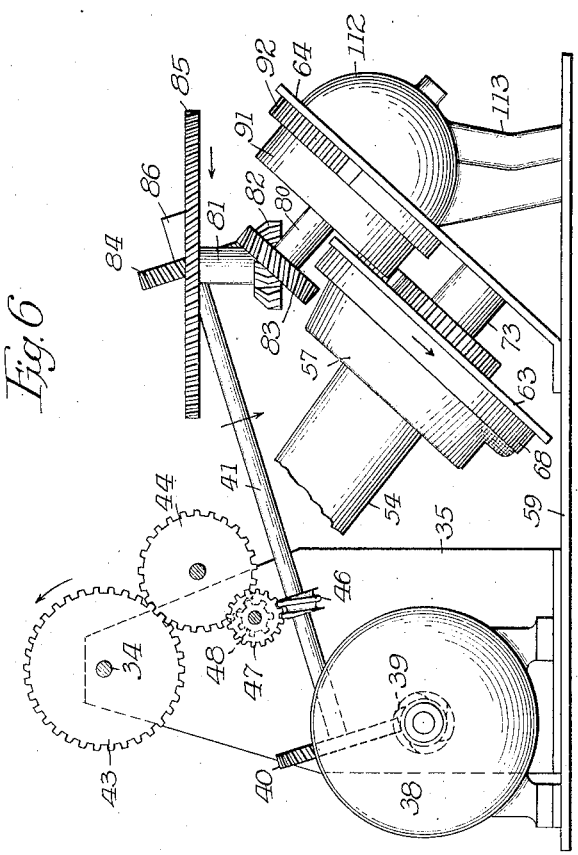
Fig. 6 is a skeleton diagram of the driving shaft and gearings for operating various mechanisms.
Figure 7:
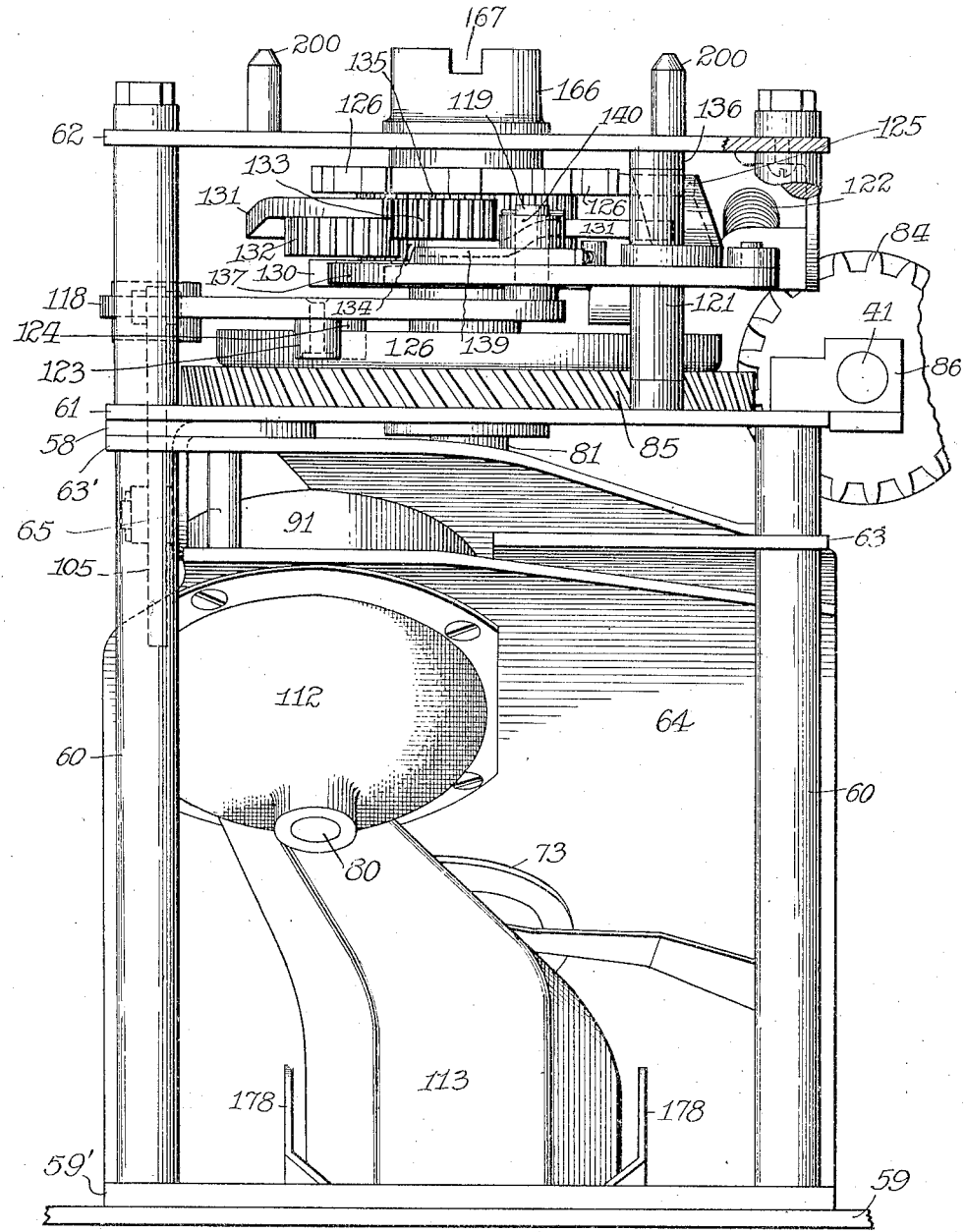
Fig. 7 is a rear elevation of the coin-measuring mechanism.
Figure 8:
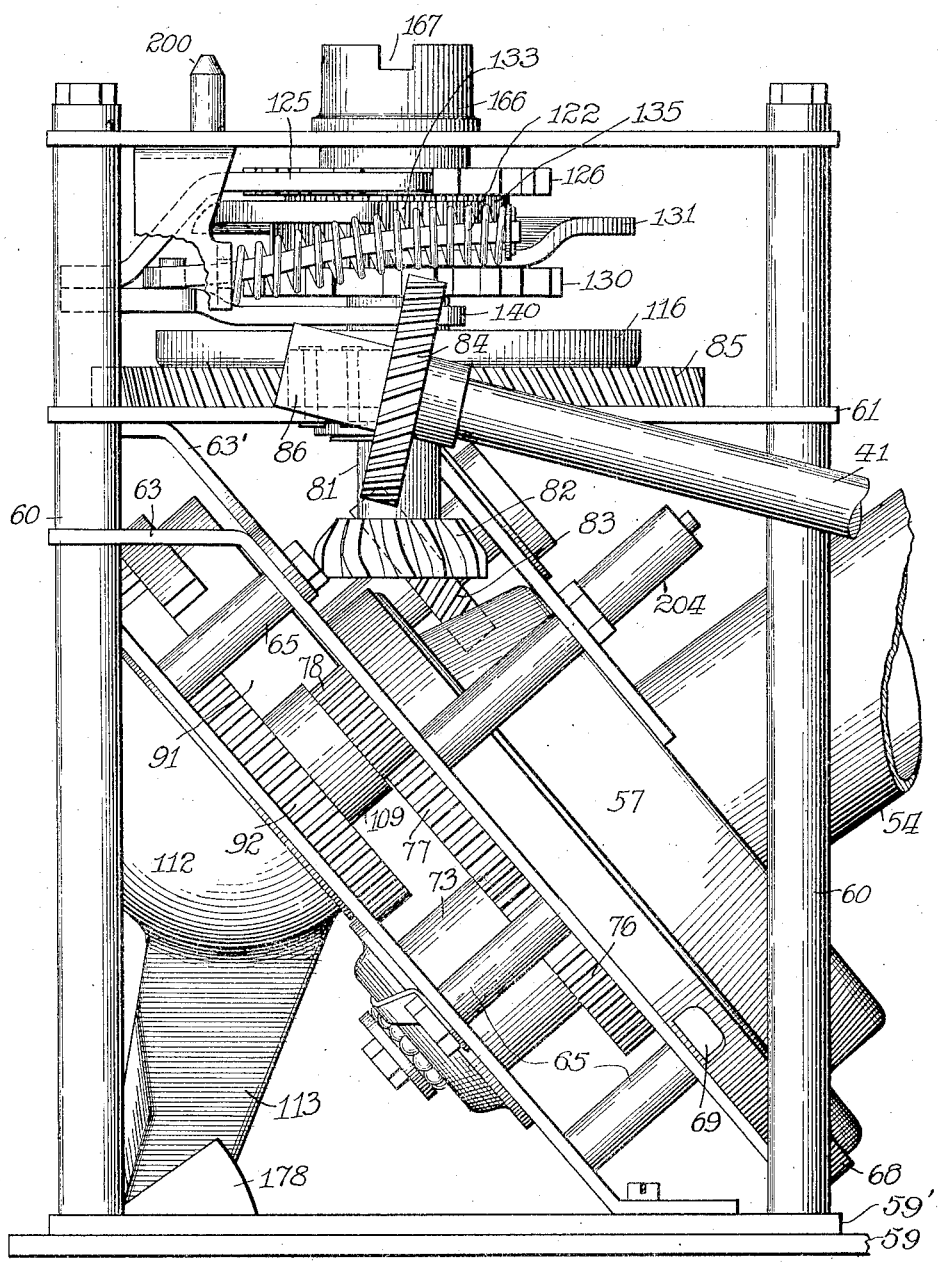
Fig. 8 is a right-hand side view of the coin-measuring mechanism.
Figure 9:
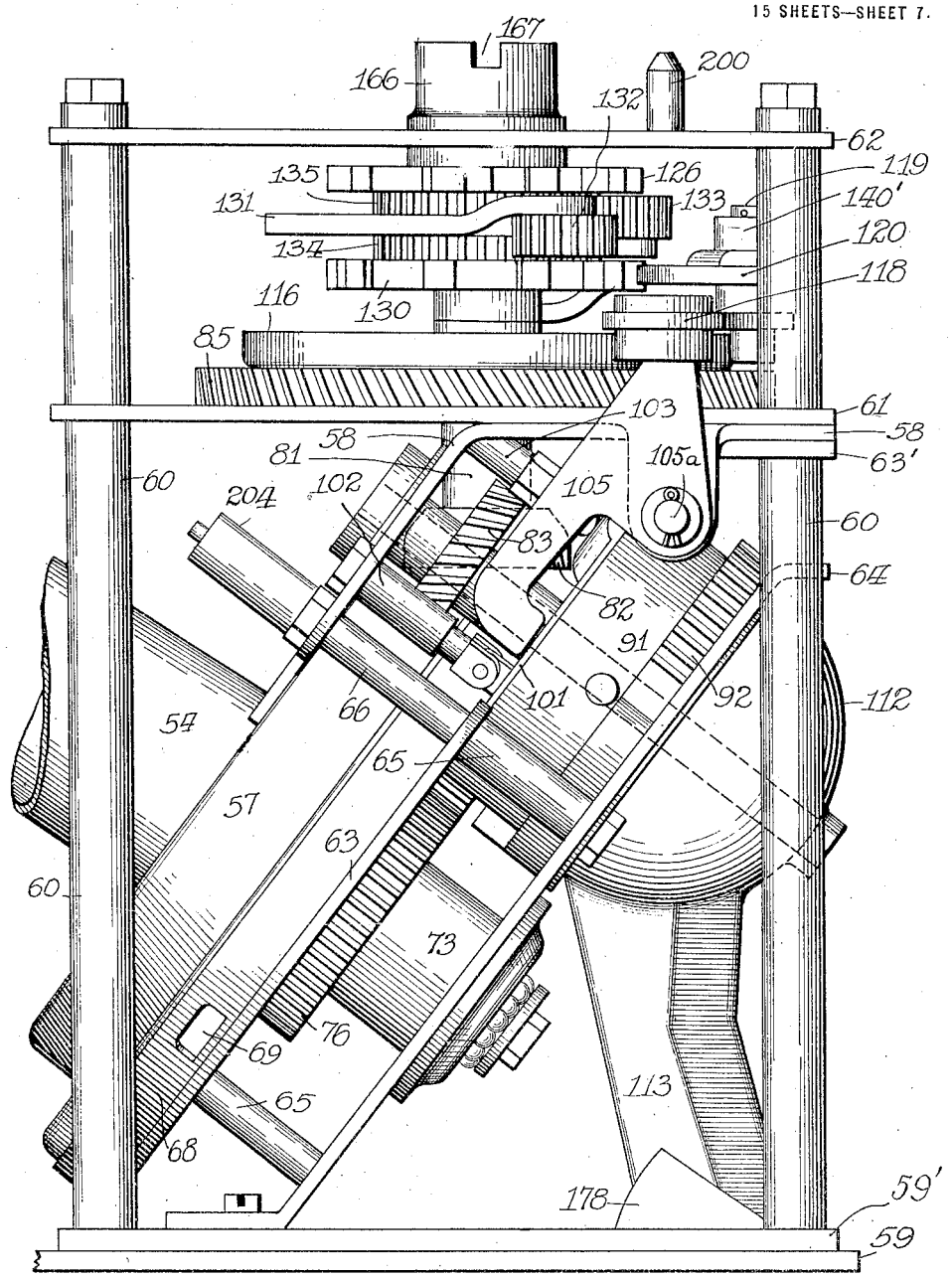
Fig. 9 is a left-hand side view of the same.
Figure 10:
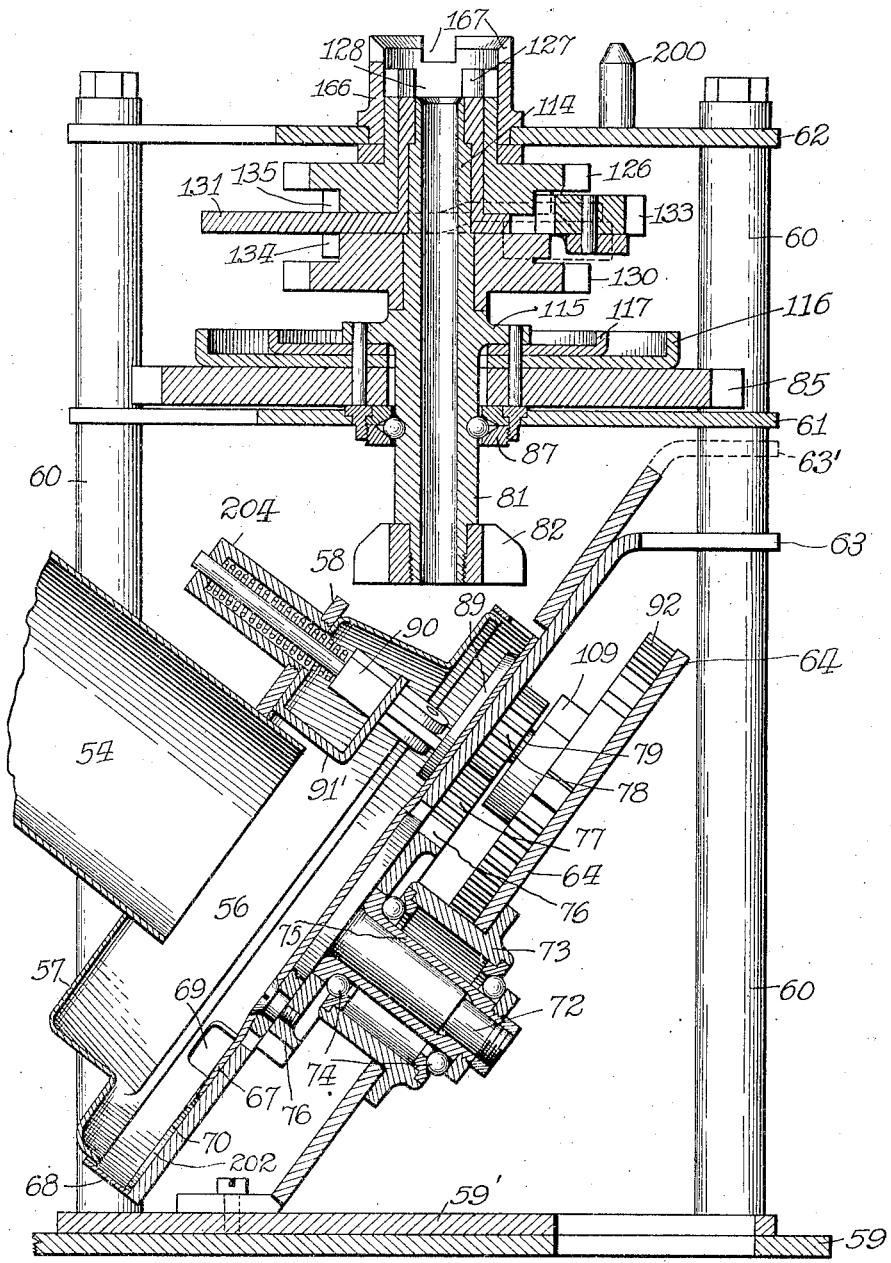
Fig. 10 is a vertical section of the coin-measuring mechanism and the clutch mechanism for transmitting motion to the register.

In Figs. 7, 8 and 10 I have shown in detail the collecting and measuring mechanism which receives the coins from the inspection mechanism. The chute 54 delivers the coins into a pan 56, which has a bell-shaped top 57, which is secured to a plate 58 forming a part of the framework of the coin-collecting and measuring mechanism. The framework of this mechanism is mounted upon a base-plate 59, which furnishes also a support for the coin-inspection mechanism and for the driving motor 38 (see Figs. 5 and 6). This framework comprises a bottom plate 59' to which are fastened four pillars or posts 60. An intermediate plate 61 is secured at its corners to the posts 60, and a top plate 62 is similarly secured to the tops of the posts 60. The coin pan 56 and the coin-gaging mechanism are located between the plates 59' and 61, while the coin-measuring mechanism, which is controlled by the testing finger, which in turn operates differential clutches forming part of the measuring mechanism, is located between the plates 61 and 62. The plate 58 which supports the cover of the coin-pan is inclined at an angle of approximately 45 degrees, but it has a horizontal portion extending beneath and parallel with the plate 61. It is fastened to the plate 61 adjacent the right-hand post 60, shown in Fig. 9. Another diagonal plate 63 supports the bottom of the coin-pan 56 and is secured to the right-hand post 60, as viewed in Fig. 10. A plate 63' secured at one corner to the left-hand post 60 in Fig. 8 and secured at its other side to the plate 63 supports the bottom 96 (see Figs. 13 and 22) of the coin-measuring chamber to be described later. Another diagonal plate 64 secured to the base plate 59' and to the plates 63 and 63' forms a support and bearings for other parts of the mechanism to be described later. The plate 64 is secured to the base-plate 59 by screws, or the like, and is also secured to the diagonal plate 63 by pillars 65. Similar posts 66 support the lower end of the plate 58 and secure it to the plate 63. The coin-pan 56 comprises a movable disk 67, having a flange 68 secured thereto and revolving therewith. The flange 68 is provided with a number of perforations 69, which permit the exit of dirt and objects smaller than a coin as the pan revolves. The bottom 67 of the pan 56 comprises a disk, the outer portions of which are provided with selecting holes 70, which select or pick up the coins one at a time from the pan 56 and feed them forward to the measuring mechanism, as will be described later.

The front edge 202 of each of the holes 70 is square and is of the thickness of a nickel or the thickest coin handled, while the rear edge of the hole is given a forward slope as can best be seen in Fig. 14, and is of the thickness of a dime or the thinnest coin handled. This permits the thickest coin to pass under the wiping-plate 89 without catching, but if two of the thinnest coins should cling together they will not both be supported by the rear edge and hence the top one will be wiped off, all as will later be described.

The bottom of the pan 67 is secured by screws 71 to a stub-shaft 72, which is provided with suitable bearings supported in the plate 64. The bearings comprise a sleeve 73 having an annular raceway for suitable ball bearings, which are held in place and have coöperating bearings on a sleeve 75 borne on the stub-shaft 72. The stub-shaft 72 is rotated by means of a gear 76, which meshes with a pinion 77 (see Fig. 15) which forms an idler between the gear 76 and the pinion 78 upon the shaft 79. The shaft 79 receives an intermittent motion from the shaft 80 (see Fig. 6) which is geared to the power shaft 41 through the countershaft 81 connected by skew gears 82 and 83. These skew gears 82 and 83 are secured on the shafts 81 and 80, respectively. The countershaft 81 receives its motion from the powershaft 41 through the skew gears 84 and 85, secured to the shafts 41 and 81, respectively. The shaft 41 has a bearing 86 fastened to the plate 61, as shown in Fig. 7.

The gear 85 is supported directly above the plate 61, in which it has a suitable bearing 87. The countershaft 81 is formed of a hollow sleeve extending upward above the gear 85, as is shown in Fig. 9, for performing the function of transmitting motion to the overhead register, as will be described later. The plate 63 which supports the bottom 67 of the coin-pan has a hole 88 therein at its upper end. The hole 88 is covered by a wiper-plate 89, which prevents more than a single coin being carried up by one of the selecting perforations 70 in the bottom of the coin-pan. The wiper 89 is pressed against the bottom of the pan by means of the spring post 90, mounted in the cap 204, which is secured to the plate 58.

Figure 15:
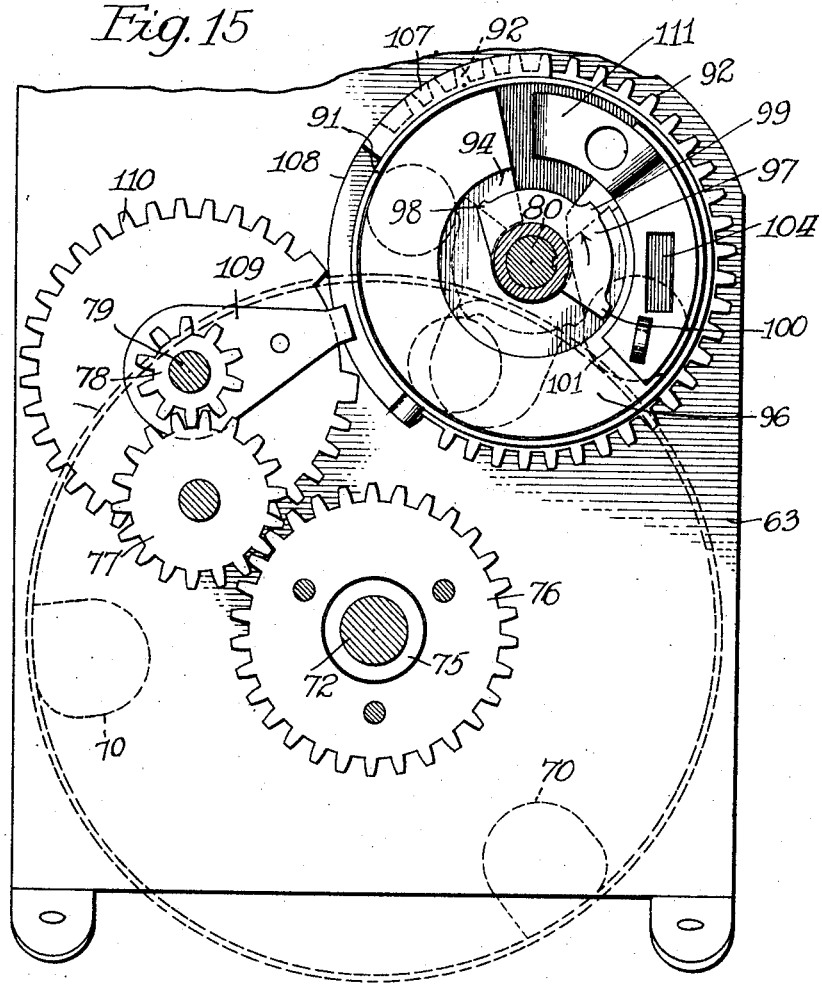
Fig. 15 is a similar view of the coin-measuring chamber and the driving gears for transmitting motion to these parts.
Figure 16:
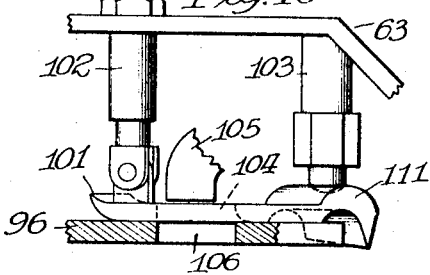
Fig. 16 is a fragmentary detail view showing the wiper in the coin-measuring chamber.
Figure 17:
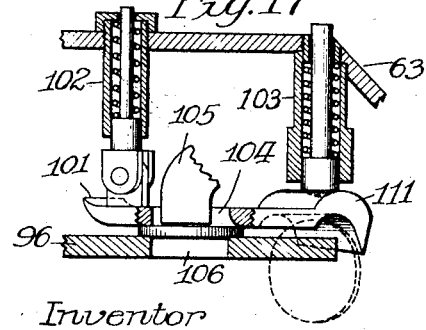
Fig. 17 is a similar view, in section, of the wiper mechanism showing a coin beneath the wiper.

After the selected coins pass through the openings 88 they drop by gravity into a short hollow cylinder 91, which comprises the measuring chamber for measuring the coins, as will be described later. The hollow cylinder 91 is mounted between the plates 63 and 64 and has cut upon its lower edge adjacent the plate 64 a mutilated gear 92, as illustrated in Figs. 13 and 15, for imparting an intermittent motion to the coin-pan. The manner in which this intermittent motion is transmitted from the shaft 80 to the coin-pan can be readily understood from Fig. 15. The mutilated gear 92 is secured to the shaft 80 by means of radial arms 95, (Fig. 21) so that the shaft 80 and the gear 92 revolve in unison. A stationary circular plate 96 lies above the radial arms 95 of the gear 92 and inside of the rim 91, which forms the coin-measuring chamber. This stationary circular plate 96 is supported by means of the auxiliary frame-plate 63' (Figs. 9 and 10,) bolted to the plate 63 and secured to one of the posts 60 as shown in Fig. 9. The coin-measuring cam 97 is keyed to the shaft 80 and lies immediately above the stationary plate 96 and revolves with the rim 91 of the coin-measuring chamber. The coin-measuring cam 97 has a plurality of gage-points (in the present machine three, 98, 99 and 100), each of which forms a measuring gage between the given point and the rim 91 of the chamber. The said gage-points form measuring mechanism for nickels, pennies and dimes, respectively. A wiper-plate 101 is pressed by means of spring posts 102 and 103 (Figs. 16 and 17) against the stationary bottom 96 of the coin-measuring chamber. This wiper plate 101 is provided with a perforation 104, through which passes a finding finger 105. This finding finger at a given point in the operation of the mechanism tests for the presence of a coin at each of the gage-points of the coin-measuring cam. A perforation 106 coincident with the perforation 104 allows the finding finger 105 to pass on through the stationary bottom 96 to the coin-measuring chamber. Attention is again called to the mutilated gear 92 for transmitting motion to the coin-selecting pan. It will be noted that the gear 92 has a part of its periphery formed into a solid rim, and that a circumferential projection or ridge 107 coextensive in radial thickness with the teeth is formed at a distance in the rear of the solid portion 108 and slightly above the same. As the gear 92 rotates in a counter-clockwise direction, as viewed in Fig. 15, the projecting ridge 107 will engage the end of a radial arm 109, secured to the gear 110 and pinion 78 having for a bearing the shaft 79, which in turn is geared to the coin-selecting pan. When the ridge 107 strikes the end of the radial arm 109 the mutilated gear 110, which is mounted on the shaft 79, is brought into mesh with the mutilated gear 92 and a rotation of the gear 110 is caused until the solid portion 108 of the gear 92 again is presented. The gears 92 and 110 are geared in substantially a 1 to 1 ratio, while the gears 110 and 76 are geared in a 3 to 1 ratio. By this arrangement the coin-pan 67 is halted every one-third of a revolution, or just at the time when one of the coin-selecting perforations 70 comes immediately above the hole 88 formed below the coin-pan in the plate 63, so that the coin selected will have sufficient time to pass down through the openings 88 in the plate 63 and drop into the coin-measuring chamber. It can now be seen that when a coin passes through the opening 88 and drops into the coin-measuring chamber it will be selected by one of the gage-points 98, 99 or 100 and will be brought forward by revolution of the coin-measuring cam and the cylinder 91, and forced against the wiper-plate 101 and brought to the point where the opening 104 passes through the wiper-plate 101. Other mechanism, which will be described later, forces the finding finger 105 downward through the opening 104 to test for the presence of a coin between the gage-points and the wall of the chamber. After the test is made the coin is thrown off of the radial edge of the plate 96 by means of the curved end 111 of the wiper-plate 101. This curved end 111 of the wiper plate 101 is to prevent the coins from being accidentally thrown back into the chamber and again measured and counted. The curved end 111 directs the coins through the opening in the plate 96 into a bowl 112, which is connected to a delivery chute 113, and from the delivery chute 113 the coins pass into the coin-box 7, as will be described later.

The means for actuating the finding finger 105 and for transmitting the results of the test to the overhead register will now be described.

*Coin-counting and value-registering mechanism.*

The countershaft 81 which is secured to the gear 85 and which transmits motion from the motor to the coin-pan and to the measuring-mechanism, is provided with an upwardly-extending sleeve portion 114 (Fig. 10) and with a flange 115, to which is secured the gear 85 and to which also are secured finding cam 116 and locking cam 117, shown more clearly in Fig. 20. The finding finger 105 is pivoted on a post 105ª (Fig. 9) secured to the frame-plate 58. The upper end of the finding arm 105 is secured by a universal coupling to the differential cam lever 118, (Figs. 9, 18 and 20) pivoted by means of the pin 119 upon the clutch lever 120. The clutch lever 120 is pivoted at 121 and is normally held in the position shown in Fig. 18 by means of the spring 122, which spring is shown more clearly in Fig. 8. The lever 118 bears two rollers 123 and 124, between which passes the rim of the finding cam. It will be noted that the finding cam 116 has three portions, which throw the rollers 123 and 124 inward. These three portions 125, 126' and 127, are for testing for the presence of coins opposite the gage points 98, 99 and 100, respectively. Or, in other words, they cause a test for the presence of pennies, nickels and dimes, respectively.

It can now be seen that as the cam 116 revolves it will cause the arm 118 to swing inwardly and outwardly, and in doing so it will move the finding finger 105 about its pivot 105ª. In case a coin appears below the finger 105 the finger will be unable to complete its movement, but, as the motion imparted by the cam 116 to the rollers is positive the other end of the lever 118, which, as stated previously, is pivoted on the clutch lever 120, will yield by overcoming the resistance of the spring 122. The lever 120 will then be swung upon the pivot 121 to cause disengagement of the dog 125 with the toothed clutch member 126. The toothed clutch member 126 has a split hub 127, which has cut therein square notches 128, which register with corresponding projections upon the hollow transmitting shaft 129, (Fig. 4) which transmits motion to the overhead register. It will be noted that the shaft 129 (see Fig. 11) has a collar secured thereto, this collar having projections meshing with the notches in the hub 127. A corresponding clutch member 130, which is shown more clearly in Fig. 23, surrounds the sleeve 114 of the counter-shaft 81 (Fig. 10). The clutch-members 126 and 130 are loosely secured by their respective hubs and each has bearings for allowing free rotation under certain conditions. A knock-off cam-plate 131, shown more clearly in Fig. 19, is secured to the sleeve 114 and rotates therewith. This cam-plate 131 bears idler gears 132 and 133, which mesh with each other and with the gears 134 and 135, respectively, which are formed upon the hub of the clutch-members 130 and 126, respectively. It can now be seen that as the countershaft 81 revolves and transmits motion to the knock-off cam 131 bearing the idler planetary gears 132 and 133, which are in effect a single gear, there will be a tendency to transmit motion to one of the gears 134 or 135 if the other is held stationary, the free gear being rotated at twice the speed of the knock-off cam 131. As previously explained, the dog 125 normally holds the clutch-member 126 stationary, so as to prevent movement thereof. The dog 125 is attached to a sleeve 136 pivoted on the shaft 121. The sleeve 136 is secured at its lower end to the clutch-lever 120. The clutch-lever has formed at its lower end a clutch-finger 137 for engaging the teeth of the clutch-member 130. The clutch arm 120, as before stated, bears the pin 119, upon which is pivoted a locking finger 139 to aid the finger 137 in holding the clutch-member 130 stationary. The pin 119 passes through the arm 120 and bears the roller 140', the roller being in line with the knock-off cam 131, so that if there should be any tendency for the parts to stick after they should become disengaged, the knock-off cam 131 will strike the roller 140' (see Fig. 19) and will drive the clutch-lever 120 back into normal position. The clutch-lever 120 has an arm 140 extending substantially at right angles thereto. This extension bears a cam pin 141 (Fig. 20) for engaging with the holding cam 117. The cam pin 141 and the holding cam 117 are for the purpose of holding the clutch-members in position during a given predetermined period of rotation, so that the proper degree of angular movement will be transmitted to the operating shaft 129 of the overhead register. The holding cam 117 is provided with only two cam portions, which are for dime and nickel transmission, respectively. The penny transmission is effected solely by the operation of the cam 116 and, as the motion is so short, there is no necessity for holding the clutch-lever after the same is once thrown into engaging position. However, it is necessary to employ the arm 140 and the pin 141 in order to secure transmission of the proper angular movement corresponding to the values of the coins measured to the register-operating shaft.

I shall now proceed to describe the overhead coin-register and the means for supporting and operating the same.

*Overhead register mechanism.*

The column 10 shown in Figs. 1, 2 and 4 comprises an outer tubular supporting-member 142, which is secured at its upper end by means of a collar 143 to a bottom plate 144 of the casing of the register 11. At its lower end the tube 142 bears a collar 145, which rests upon a sleeve 146, forming a part of the casing surrounding the coin-selecting and measuring mechanism. The sleeve 146 is provided with a notch and the collar 145 with a corresponding tongue to prevent rotation of the parts and to insure assembly in a predetermined manner. The tube 142 is threaded at its lower end and a lock nut 147 holds it in place in the collar 146, which forms an extension of the top part of the casing 9. Within the tube 142 forming the outside of the column 10 there is a second tubular shaft 148, which is secured at its upper end by means of a collar 149 to a locking arm 150, which secures the casing 12 upon the base-plate 144, by the means shown in Fig. 12. The base-plate 144, which is secured to the collar 143, is provided with a recess 151, so positioned that the swinging lever 150 can have a limited angular movement therein. The bottom of the register casing 12 bears a pair of notched posts 205, which may be inserted through holes in recess 151 in the base-plate 144, when the casing 12 is brought to its upper position. The inclined edges of the arms 150 engage the notches in the pins 205, by a wedging action holding the casing 12 securely against the top of the register. The coin-register proper comprises a number of movable counting wheels 152 (Fig. 25) for registering the number of fares or fees which have been counted. The counting wheels 152 are supported upon a shaft 153 having its end secured to the side frame-plates 154, which are mounted upon the base-plate 144. Register wheels 155 for indicating the coins collected and measured in dollars and cents are also provided. These register wheels 155 are mounted upon a shaft 156 having its ends secured in the frame-plates 154. The register wheels 152 and 155 are connected by a chain of mechanisms including the gears 157, 158 and 159. A gear 160 attached to the first or unit register wheel 155 meshes with the gear 159 and serves to transmit motion thereto. The gear 157 is not directly connected to the fare-register 152, but is connected so that motion will be transmitted whenever the unit wheel 155 has reached "5" or a multiple thereof in its course of registration. The gear 160 is driven through the skew gears 161 and 162 by means of the countershaft 163 and the gear 164, which meshes with the gear 165, secured to the register driving-shaft 129, forming the central hollow shaft of the column 10. The register driving shaft 129 (see Fig. 4) is connected, as previously explained, to the hub 127 of the combined clutch and gear members 126 and 135. A stationary hub 166 (see top of Figs. 7, 8 and 9) is secured to the plate 62 at the top of the coin-measuring mechanism. This collar 166 has diametrical notches 167 cut therein to correspond with the tongues extending from the collar 168, which is secured to the hollow shaft 148. (See also Fig. 11.) The tongues of the collar 168 are so positioned angularly that the shaft 148 must be turned to the predetermined position to bring the locking-arm 150 into the slot in the locking pins 152 at the bottom of the overhead register. This insures correct assembly of the parts under all circumstances.

The chain of mechanisms between the finding finger 105 and the registering wheels 152 has now been set out so that it can readily be understood that this finger 105 controls the clutch-mechanism in the nature of a differential lever. This lever in turn controls a differential gear mechanism for connecting the register-advancing shaft to the power or driving mechanism to transmit a certain given angular motion to correspond to the value of the coins measured in the measuring-chamber. It can be seen from the diagram of Fig. 6 that, inasmuch as the gear 85 which bears the cam 116 is geared directly and positively to the coin-measuring chamber, the finding finger 105 will be brought down to test for the presence of a coin opposite each one of the gage-points corresponding to a predetermined value of coin, so that, if a coin is found at any one of the gage-points through the mechanism of the finger, the corresponding portion of the cam 116 will cause such a movement of the clutch-lever 120 as to disengage the dog 125 from the clutch-member 126 for a predetermined part of the angular movement of the cam-shaft 114, at the same time engaging the finger 137 with the clutch-member 130 long enough to cause the knock-off cam carrying the planetary gears 132 and 133 to advance the register-actuating shaft 129 the desired and proper amount to register the value of the coins measured and counted. The mechanism of the register 11 may be of any preferred type, such as the type described in my co-pending application Serial No. 808,381, filed on December 23, 1913.

I shall now proceed to describe the casing inclosing the coin-measuring mechanism and the coin-box in the base of the machine.

Casing.

The casing of the mechanism, which I have indicated broadly by reference character 9, comprises a number of features of novelty.

As previously explained, the casing surrounding the coin-inspection mechanism is made transparent so that inspection of the coins may be readily carried out. All four sides of this casing are formed of plates of glass 168, which are secured by means of the corner-posts 14 to the casing 169 immediately surrounding the top of the inspection cylinder and the top of the coin-measuring and counting mechanisms.

Immediately below the part of the casing 169 is a rectangular portion 170 secured as by bolting from within, to the part 169. The casing 170 surrounds the base-plate 59 and is secured thereto by inwardly-extending lugs, secured to said base-plate by means of bolts fastened from the inside of the bottom part of the casing 171, which forms the lowermost section of the casing 169. The section 171 comprises preferably a sheet metal case surrounding an angle-iron frame of any desired form. A suitable shelf (not shown in the drawings but indicated by the dotted lines in Fig. 2) supports the coin-box 7 a slight distance above the ground upon which the casing 171 rests. In placing the casing over the mechanism the alinement of the parts is insured by sockets 199 on the casing 169 (Fig. 4) which coöperate with pins 200 on the top plate 62 of the measuring-mechanism.

I shall now proceed to describe the coin-box and its relation to the rest of the mechanism.

Coin-box and related mechanism.

The coin-box 7 is preferably a metal box provided with means for automatically closing the same when it is withdrawn from its usual relation to the coin-collecting and registering mechanism. This box is provided at each end with suitable handles 172 to provide convenient means for handling the same. The front of the coin-box 7 is perforated, having a slot 173, through which the collector may insert tickets, transfers, or the like. A lock 174, provided with a detachable key 175, is located in the casing 171 immediately above the top of the coin-box 7. The bolt of the lock 174 coöperates with a lug or abutment 176 (Fig. 28) to hold the coin-box locked in position in the casing 171. The lock 174 is preferably of the type which will not permit withdrawing of the key 175 unless the bolt is thrown. When the coin-box 7 is in position within the casing 171 (see Fig. 28) the inside end of the box engages a finger 177, which is secured to a plate 178 normally held by means of the spring 179 in its raised position. When the finger 177 is engaged by the end of the coin-box 7 the plate 178 is held in the position shown in Fig. 28 and it directs the coins delivered from the chute 113 into the opening in the top of the coin-box 7. The coin-box is provided with means for automatically closing this opening and locking the same when the box is withdrawn from the casing, as when it is desired to remove the coins or to replace the full coin-box with an empty one. For this purpose a sliding sheet-metal top 180 is arranged to run in suitable guides 181 on opposite sides of the box, to close the openings through which the coins normally drop when the box is in the position shown in Fig. 28. A swinging arm 182, shown in dotted lines in Fig. 27, bears at its outer end a pair of pins 183 and 184. These pins, playing in suitable slots, allow a slight angular movement of the arm 182 about its pivot 185. A cam lever 186 is riveted to the arm 182 and serves, in connection with suitable cam-guides 193 fastened to the sides of the coin-box, to insure proper opening of the cover when the box is inserted in the casing 171 and to insure proper closing and locking of the cover when the box is withdrawn from the casing 171. The sliding cover 180 is provided with a depending flange 187, which, when moved to the closed position, is engaged by the bolt of the spring lock 188, secured to the back wall of the coin-box 7. A depending cam-post 190 is secured to the top of the casing 171 and projects in the path of the pin 183, which strikes the post 190 when the coin-box is placed in position. Another post 189, also secured to the top of the casing 171, projects in the path of the pin 183 and prevents accidental closing of the top 180, as by jarring, when the box is in position. The pins 183 and 184 are at this time past the cam-post. When the coin-box 7 is to be inserted in the casing 171 the bolt of the spring lock 188 is released so that the sliding cover 180 may be free to be shoved backward as the box is inserted in the casing. It will be found, however, that unless the posts 189 and 190 were provided for maintaining the cover in certain predetermined positions when the box is inserted and withdrawn, it would be quite likely that the cover 180 might be in closed position when the box is inserted for the collection of coins. It is evident that if it were possible to insert a locked box, the coins would not properly drop within the coin-chamber in the coin-box and loss might be occasioned. Assume, therefore, that the cover 180 is unlocked and free to be slipped back in open position and is standing in the dotted-line position shown in Fig. 28, and as the box 7 is introduced into the opening in the casing 171. The post 189 is merely a light bracket for preventing the sliding cover 180 from being jarred to the closed position when the box is placed in position in the casing. The post 190, however, must perform the duty of properly opening the coin-box and properly causing the same to be locked when withdrawn and is therefore supported by a piece of angle-iron 191 shown in dotted lines in Fig. 27. When it is desired to place the coin-box in the casing it is necessary first of all to release the lock 188 and then to shove the coin-box into position. It is to be noted that the arm 182 and the cam-lever 186 are pivotally mounted on the sliding cover 180. If the box is locked and an attempt is made to place the same in position, the pin 183 will lie in the path of the projection 190, and, due to the fact that the ends 192 of the cam-lever 186 engage the raised portion 193 of the cams which are secured below the sliding cover 180 in line with the cam-lever 186, the inclined face of the post 190 will be unable to cause rotation of the arms, as the ends 192 of the cam-arm 186 prevent the same. If the lock be released the slide 180 will be pushed back into the position shown in Fig. 27. At this time the ends 192 of the cam-arm 186 allow a rotation of the arm 182, as the ends 192 are now opposite a depressed portion 194 of the cam 193. Hence, the inclined face of the post 190 will cause the arm 182 to swing in a counter-clockwise direction, as viewed in Fig. 27, and the pin 183 will be cleared of the post 190 and will immediately drop back to its normal position, so that the pin 184 will not interfere with the post 190. The spring 195 normally urges the arm 182 in a clockwise direction, as shown in Fig. 27. The coin-box is then locked in place by means of the bolt 174. It is to be noted that the block 176 which coöperates with the bolt of the lock is of such a length that the bolt cannot be thrown until the box is pushed all the way into position, so that the posts 183 and 184 lie between the posts 189 and 190. When it is desired to withdraw the coin-box from the casing 171 it is necessary to unlock the lock 174 and to withdraw the box from its position. The pin 183 will strike the rear cam surface of the post 190 and will draw the cover 180 to the closed position, inasmuch as the pin 183 is held stationary against movement while the box itself is being withdrawn. The sliding cover 180 is drawn to the closed position so that the catch 187 passes over the spring bolt of the lock 188 to hold the cover in closed position, but the pin 183 still engages the back curved surface of the post 190 and it is necessary to swing the pin 183 out of engagement with the post in order to allow the box to be withdrawn. For this purpose the raised cam portion 196 engages the shorter arm of the lever 186 and swings the arm 182 in a counter-clockwise direction to disengage the pin 183 from the post 190.

The pin 184 is a double safeguarding device preventing manipulation of the coin-box. If only the pin 183 were employed it might be possible for a dishonest employee to block the pin 183 into its left-hand position when the box is inserted and then to withdraw the box without causing locking of the cover 187.

It can be seen from Fig. 28 that I have placed a partition 198 in such position above the slot 173 as to form a separate compartment for transfers, tickets, or the like. Access may be had to the compartment 197 by means of a trapdoor in the bottom of said compartment. It is to be noted that the compartment is locked in the closed position of the coin box, inasmuch as the trapdoor is within the casing 171 when the box 7 is in the proper position.

General operation.

In the general operation of the mechanism above described, the coin-handling mechanism 4 will be placed adjacent the entrance of an inclosure, such as a theater, railroad station, or the like, and the patron on coming through the gate or entrance deposits a suitable coin in the hopper 6 of the coin-handling mechanism, under the supervision of a guard or collector, who stands adjacent the entrance and can watch the deposit of coins. The coins pass down through the holes in the hopper and travel down the slides 20 and 24 on to the inspection cylinder, which feeds forward at a proper rate, the coins dropping into the hopper. The collector upon detecting an improper or spurious coin may stop the cylinder and prevent the coin from being fed forward until the patron's attention can be called to the coin itself, and a suitable coin dropped into the hopper instead. From the feeding and inspection cylinder the coin drops down into a chute into the coin-pan, where the coins are selected, one at a time, and dropped into the measuring chamber. Here the coins are caught between the gage-points of the coin-measuring cam and the wall of the measuring-chamber and are fed forward to the finding point, where the finding finger 105 tests for the presence of a coin of a given denomination. The finding finger governs in turn the clutch-mechanism, which is operated to transmit a predetermined amount of angular motion to the register-actuating shaft, in accordance with the value of the coins caught at the gage-points of the measuring cam. Motion is transmitted through the differential clutch-mechanism to the overhead register where the value of the coin measured is registered, both in dollars and cents and in fares. From the measuring-chamber the coin is discharged into the discharge chute and from there passes into the locked coin-box 7, from which it may be removed by a properly authorized person, as above described.

It will be understood that the driving motor operates constantly, so that the mechanism is always in condition to receive, measure and register coins dropped into the hopper.

The coin-handling and registering mechanism is so placed with respect to the inclosure that a proper officer or servant of the company can see from the inside of the inclosure whether the proper registration of the incoming patrons is made.

It can be seen that the present invention marks a decided improvement in the art. It eliminates the troublesome and expensive ticket-selling and "ticket-chopping" which have heretofore been found necessary. It can take care of a greater number of patrons and provide for better inspection. It provides means which secures the same result as strict honesty on the part of employees, since the overhead indicator counts the number of fares paid and the admission of a person without paying fare is at once obvious to an inspector and to the patrons within the inclosure. Connivance between or among the employees of the service company is impossible, since the coins are not handled by them until a permanent record is made. Similarly, connivance between the employees and members of the public is of no avail, because the counting and indication are entirely out of the hands of the employees and any failure to perform their duty is at once apparent to any one.

It is obvious that numerous changes and modifications will suggest themselves to those skilled in the art, but all such modifications and changes I consider to come within the spirit and scope of my invention as defined by the appended claims.

What I claim as new and desire to secure by Letters Patent of the United States is:

1. A mechanism of the class described comprising in combination with a motor, a coin measuring device, a coin feeding means, said device and means driven directly from said motor, means for disengaging the drive to said feeding means, and a coin registering mechanism driven from said measuring device, whereby coins are received from the feeding means by said device and discharged to said mechanism.

2. In a mechanism of the class described, a driving motor, an inclined shaft driven thereby, a coin feeding cylinder, driving connections between said cylinder and said shaft, coin measuring means driven directly by said shaft adapted to receive coins from said cylinder, means for disengaging the drive to said cylinder, and a coin register driven by said measuring means to receive the coins therefrom for registration.

3. In a device of the class described, a coin measuring mechanism, a coin feeding cylinder therefor having a plurality of pockets on the periphery thereof to receive one coin in each of said pockets, a driving motor, a gear train drive between said motor and feeding cylinder, one gear of said gear train between said cylinder and motor being adjustable to be moved out of driving relation to disconnect the drive to said feeding cylinder, and coin registering means driven by said measuring mechanism and receiving coins therefrom for registration.

4. In combination, a register, a coin-collecting hopper, a constantly operating coin-measuring mechanism for operating said register, in accordance with the coins measured, means for positively feeding coins from said coin-hopper to said measuring mechanism, said feeding means being driven in unison with said measuring mechanism, a housing for said feeding means, said housing having a transparent portion, and means for independently disconnecting said coin-feeding mechanism.

5. In combination, a register, a coin-collecting hopper, a power-driven, constantly-operating coin-measuring mechanism for operating said register in accordance with the coins measured, coin-feeding mechanism for positively feeding coins from said coin-hopper to said measuring mechanism, said feeding means being operatively connected to said coin measuring mechanism, and means for independently disconnecting said coin-feeding mechanism.

6. In combination, a register, a coin-collecting hopper, a power-driven, constantly-operating coin-measuring mechanism for operating said register in accordance with the coins measured, coin-feeding mechanism for positively feeding coins from said coin-hopper to said measuring-mechanism, a housing for said feeding mechanism, said housing having a transparent portion, said feeding-mechanism being normally driven in unison with said coin-measuring mechanism, and means for independently stopping said coin-feeding mechanism.

7. A structure of the class described comprising a motor, a coin measuring mechanism driven directly thereby, coin registration means driven by said mechanism, coin feeding means for transporting coins bodily and individually for discharge to said measuring mechanism, a swingingly mounted gear driving said feeding means, and driving connections from said motor to said swingingly mounted gear.

8. The combination with a coin measuring mechanism and registration means driven thereby and receiving coins therefrom, of a rotative feeding cylinder having a plurality of pockets, one for each coin, to feed the coins singly toward said measuring mechanism, a motor driving directly to said measuring mechanism, and direct driving connection between said feeding cylinder and said motor.

9. In combination, a coin-hopper having a perforated bottom, a normally operating feeding-mechanism adapted to receive coins from said hopper, said feeding mechanism including a traveling surface with transverse ridges across said surface, a constantly driven coin-measuring mechanism adapted to receive coins from said traveling surface, means connecting said traveling surface to said coin measuring mechanism, and means for stopping said traveling surface.

10. In combination, a coin-collecting hopper having a perforated bottom, a normally-operating feeding-mechanism including a traveling surface below said perforated bottom, said surface having ridges thereupon transverse to the line of travel thereof, means for guiding coins upon said surface, means for laying said coins flat upon said surface between said ridges, means for driving said surface and coin measuring means for receiving the coins from said surface and measuring the same.

11. The combination with a coin measuring and coin registration mechanism, of means for feeding coins thereto, said means comprising a rotative cylinder, a plurality of individual pockets on the periphery thereof, one provided for each coin to be measured and registered, and a chute to receive the coins from said cylinder for passage to said measuring and registering mechanism.

12. A structure of the class described, comprising a driving motor, an inclined shaft driven thereby, coin measuring mechanism driven by said shaft, a worm on said shaft, a feeding cylinder for feeding coins to said mechanism, a gear train connected to said cylinder and driven by said worm and means for displacing a part of the gear train to disconnect the drive to said feeding cylinder.

13. A structure for a fare register comprising a driving motor, coin registering means, coin measuring mechanism driving said means, driving connections directly connected between said mechanism and motor, means driven directly from said motor to feed coins to said measuring mechanism, and means for disentraining the drive to said feeding means and positively stopping the same from continued movement.

14. In combination, a coin register, continuously driven coin-measuring mechanism for advancing said register in accordance with the coins measured, means geared to said coin measuring mechanism for feeding said coins to said measuring means, and means for disconnecting said feeding mechanism to stop the registration of coins.

15. In combination, constantly driven coin-selecting and measuring means, constantly-operating means to drive said selecting and measuring means, a coin-feeding surface for feeding coins to said selecting and measuring means, said surface comprising a plurality of channels for receiving coins flat in the bottom thereof, a driving connection from said driving means to said feeding surface, and means for disconnecting said connection and holding said feeding surface in a fixed position.

16. In a device of the class described, a motor, coin measuring mechanism, a shaft inclined and driving directly from said motor to said mechanism, a worm on said shaft, a feeding cylinder for feeding coins to said mechanism, a gear train driven by said worm and driving said feeding cylinder, and a gear forming a part of said gear train shiftable to disconnect the drive to the feeding cylinder without affecting the drive to said measuring mechanism.

17. A structure of the class described, comprising a casing, a motor therein, coin measuring mechanism driven directly by the motor, coin registering means driven by the mechanism, a coin receiving and feeding cylinder having a plurality of pockets thereon, each one adapted to carry a single coin, a chute to receive the coins from said cylinder and carry the same to said mechanism, driving connection driving between said motor and feeding cylinder and means for disconnecting said driving connections and applying a brake to positively stop the cylinder from movement.

18. A structure of the class described, comprising a motor, coin measuring mechanism driven thereby, coin registering means driven by said mechanism, a shaft driven by said motor, a worm on said shaft, a worm gear driven thereby, a feeding cylinder, a gear rotating therewith, a pivotally displaceable gear meshing with said last mentioned gear and driven from said worm and worm gear, and means for applying a brake to the cylinder to keep the cylinder from movement when said pivotally mounted gear is displaced.

19. The combination of a motor, an inclined shaft, a worm wheel on the shaft, a worm on the motor meshing therewith, a worm on said inclined shaft, a coin feeding cylinder, a gear train driving said cylinder and driven by said second mentioned worm, coin measuring and registering mechanism to receive coin from the feeding device, and means for disentraining a part of said gear train driven by said device.

In witness whereof I hereunto subscribe my name this 10th day of April, A. D. 1915.

ARTHUR H. WOODWARD.

Witnesses:
ERNEST W. RAPALEE,
KARL J. JACOBSON.